United States Patent [19]
Sweet

[11] Patent Number: 5,252,034
[45] Date of Patent: Oct. 12, 1993

[54] AIR DRYER WITH INTEGRAL ISOLATION VALVE

[75] Inventor: Roger L. Sweet, Deputy, Ind.

[73] Assignee: Holset Engineering Company, Inc., Columbus, Ind.

[21] Appl. No.: 940,642

[22] Filed: Sep. 4, 1992

[51] Int. Cl.$^5$ .................................... B01D 19/00
[52] U.S. Cl. ................................ 417/279; 55/218
[58] Field of Search ............ 417/279, 297; 55/163, 55/218

[56] References Cited

U.S. PATENT DOCUMENTS

| | | | |
|---|---|---|---|
| 4,018,579 | 4/1977 | Hofman | 55/213 |
| 4,026,685 | 5/1977 | Grix | 55/213 |
| 4,052,178 | 10/1977 | Frantz | 55/212 |
| 4,092,569 | 1/1990 | Kojima | 55/218 X |
| 4,504,081 | 3/1985 | Shimizu et al. | 280/714 |
| 4,512,781 | 4/1985 | Caralli et al. | 55/26 |
| 4,707,166 | 11/1987 | Khosropour | 55/213 |
| 4,710,108 | 12/1987 | Soupal | 417/298 |
| 4,713,094 | 12/1987 | Yanagawa et al. | 55/163 |
| 4,955,994 | 9/1990 | Knight et al. | 55/163 |
| 4,993,922 | 2/1991 | Lauterbach et al. | 417/279 |
| 5,002,593 | 3/1991 | Ichishita et al. | 55/218 |
| 5,066,317 | 11/1991 | Gross et al. | 55/217 |

*Primary Examiner*—Richard E. Gluck
*Attorney, Agent, or Firm*—Woodard, Emhardt, Naughton, Moriarty & McNett

[57] ABSTRACT

A unique air dryer for use in an air compressor system which includes an air governor, an air compressor and a storage tank is disclosed. The air dryer incorporates therein an isolation valve adjacent the inlet from the compressor which serves to isolate the compressor during the unloading cycle. Also incorporated into the housing of the air dryer is a purge valve which is simultenously opened when the isolation valve is closed, and vice versa. A check valve is also incorporated into the air dryer housing adjacent the outlet to the storage tank. Finally, a small conduit connecting the inlet port from the compressor to the outlet of the air dryer is included. A small check valve is disposed within the conduit so that air flow is only permitted to flow from the outlet to the inlet when the system is in its unloaded mode in order to maintain pressure in the pipe which connects the compressor to the air dryer.

12 Claims, 4 Drawing Sheets

AIR DRYER WITH INTEGRAL ISOLATION VALVE

BACKGROUND OF THE INVENTION

The present invention relates generally to air dryers for use in air compressor systems.

U.S. Pat. No. 4,993,922 to Lauterbach et al. describes an air compressor unloader system that solved two problems which had persisted in the art of air compressor systems. In particular, the Lauterbach air compressor system acts to prevent significant amounts of oil from seeping around the compressor piston rings when the compressor is in its unloaded mode and also greatly reduces the horsepower used by the air compressor in its unloaded mode. These problems were solved by the inclusion of an isolation valve between the compressor and the air dryer such that the compressor could be isolated to form an air spring during its unloaded mode. At the same time, the pressurized air stored in the conduit between the air dryer as well as the pressurized air contained in the air dryer itself is purged through a spitter valve at the bottom of the air dryer during the system's unloading mode.

One concern of the Lauterbach et al. is the expense of the system due to the number parts, additional piping between the various components, and the increased complexity of the system as a whole. What is needed is an air compressor system that retains the advantages resulting from an "air spring" as taught by Lauterbach, but without the additional components and complexity of Lauterbach.

SUMMARY OF THE INVENTION

A gas dryer for use in cooperative arrangement with a gas compressor system having a gas compressor, a gas governer and a gas reservoir, comprises a housing. The housing has a first port, a second port and an outlet. The housing also includes primary and secondary passageways which extend between the first port and the second port. The primary passageway includes a means for removing moisture form a gas passing through the primary passageway and a first valve situated between the first port and the means for removing moisture. The first valve is biased open but is capable of closing in response to a first signal from the gas governor. A second valve that is located in the secondary passageway allows gas to flow in only one direction from the second port to the first port. A branch passageway extends from the primary passageway to the outlet of the housing. The branch passageway opens into the primary passageway between the first valve and the means for removing moisture. A third valve is located in the branch passageway, which valve is biased closed but is capable of opening in response to a second signal from the gas governer.

One object of the present invention is to provide an improved gas dryer for gas compressor systems.

Related objects and advantages of the present invention will be apparent from the following description.

DESCRIPTION OF THE PREFERRED EMBODIMENTS

Figure 1:
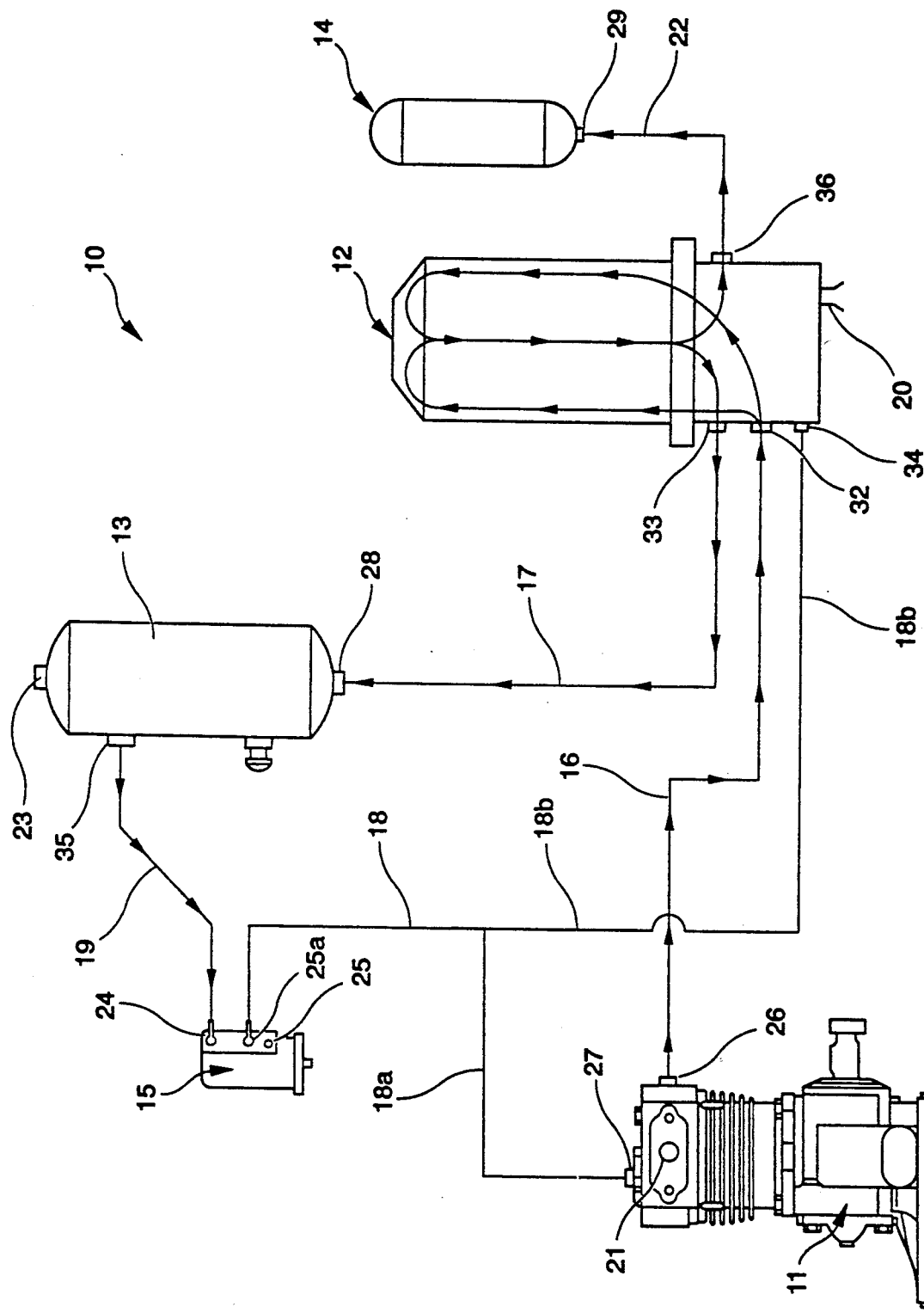
FIG. 1 is a schematic view of an air compressor system according to the present invention shown during its loading cycle.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of tee principles of the invention as illustrated therein being contemplated as would normally occur to one skilled in the art to which the invention relates.

Referring now to FIG. 1, there is shown an air compressor system 10 according to one embodiment of the present invention in its loading cycle. Air compressor system 10 includes an air compressor 11 of the type described in Lauterbach et al., U.S. Patent No. 4,993,922, which is incorporated herein by reference. Compressor 11 includes an inlet 21, an outlet 26 and a pneumatically operated unloader 27. During the loading cycle as shown in FIG. 1, compressor 11 pulls air from the atmosphere through inlet 21 and expels compressed air through outlet 26. The compressed air then travels through pipe 16 to compressor part 32 of air dryer 12. The compressed air passes through the interior of air dryer 12 to remove the moisture from the air and then the dried compressed air exits the air dryer via ports 33 and 36. Purge tank port 36 is connected to a purge volume container 14 via pipe 22 at inlet 29. Dry compressed air also flows via pipe 17 into inlet 28 of storage tank 13. It being understood that purge volume container 14 could have equally well been incorporated into the structure of air dryer 12 or into the structure of the storage tank without altering the function of the air compressor system 10 shown in FIG. 1.

Storage tank 13 is continuously filled with dry compressed air during the loading cycle. Air compressor system 10 is capable of supplying dry compressed air to air supply systems such as for truck air brakes and the like via outlet 23 from storage tank 13. Storage tank 13 also includes a second outlet 35 which continually communicates the pressure within storage container 13 via pipe 19 to inlet 24 of air governor 15. Air governor 15 has a reservoir port 24, an unloader port 25a and an exhaust port 25. Air governor 15 is of conventional design, and may be preset by means well known in the art to respond to certain operating conditions required by the system.

Figure 2:
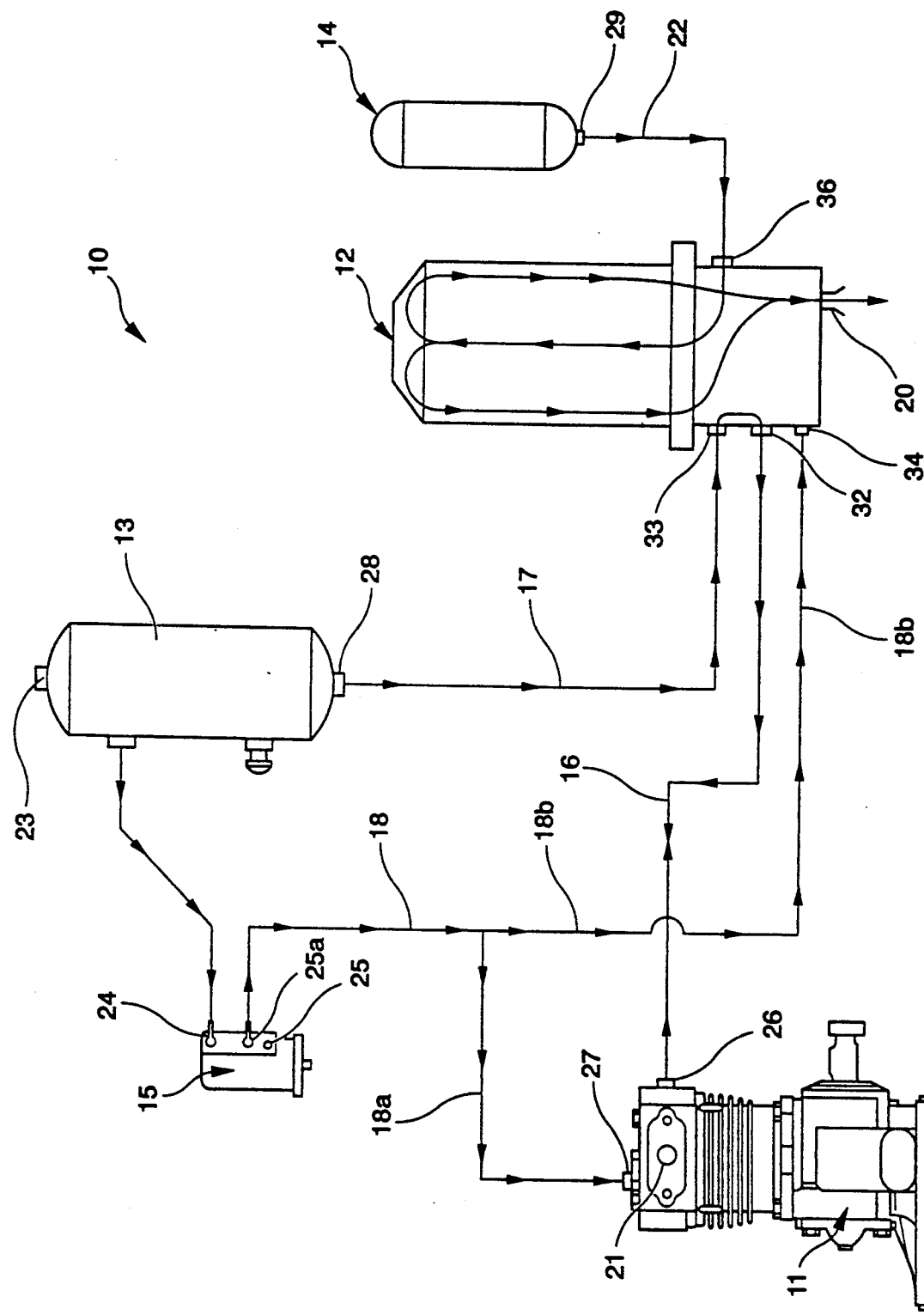
FIG. 2 is a schematic view of the air compressor system shown in FIG. 1 during its unloading cycle.

Air governor 15 controls air compressor system 10 by switching it between its loading cycle shown in FIG. 1 and its unloading cycle as shown in FIG. 2. When the pressure in storage tank 13 drops below a first predetermined pressure, air governor 15 will switch the system to its loading cycle and continue in the loading cycle until the pressure in tank 13 is raised above a second predetermined pressure, at which time the air governor 15 will again switch the air compressor system 10 to is unloading cycle as shown in FIG. 2. In other words, air governor 15 controls the system 10 to maintain the air pressure within storage tank 13 between predetermined minimum and maximum pressures.

Air governor 15 senses when storage tank 13 is filled with dry compressed air via pipe 19. When air governor 15 senses that the storage tank is full, i.e., attained its maximum pressure, governor 15 opens unloader port 25a to allow dry compressed air to enter pipe 18. As shown in FIG. 2, the compressed air then branches off into pipe 18a to the compressor and pipe 18b to air dryer 12. The compressed air in pipes 18a and 18b activate valves in compressor 11 and air dryer 12 to switch the system to its unloading mode and create a flow pattern as shown in FIG. 2. As in Lauterbach et al., compressed air in pipe 18 flows into unloader port 27 of compressor 11 to activate a valve that blocks inlet 21 during the unloading cycle to prevent atmospheric air from entering the compressor during the unloading cycle. At the same time, compressed air in pipe 18b flows into inlet 34 of air dryer 12 to activate internal valves to change the flow pattern in air dryer 12 during the unloading cycle.

During the unloading cycle, the compressed air stored in purge tank 14 is allowed to be metered into air dryer 12 via port 36 and flow in the reverse pattern through the desiccant material of the air dryer 12 to regenerate the same and flush the moisture through purge outlet 20 at the base of air dryer 12. At the same time, storage tank 13 is connected directly through a separate passageway to the compressor 11 such that pipe 16 is kept pressurized during the unloading cycle to complete the formation of an "air spring" in compressor 11, as is better described Lauterbach et al. The flow pattern through air dryer 12 is changed by the pneumatic activation of valves within the air dryer due to a pressure signal received through pipe 18b from air governer 15. Air compressor system 10 will continue in its unloading cycle as shown in FIG. 2 until the pressure within storage tank 13 drops below a predetermined pressure at which the air governor 15 is preset to switch the system to its loading cycle to refill the storage tank. Air governor 15 switches the system by opening exhaust port 25 such that the compressed air in pipes 18a and 18b flows back up through pipe 18 and out exhaust port 25, which in turn allows the various pneumatically activated valves in compressor 11 and air dryer 12 to return to their loading cycle positions.

Figure 3:
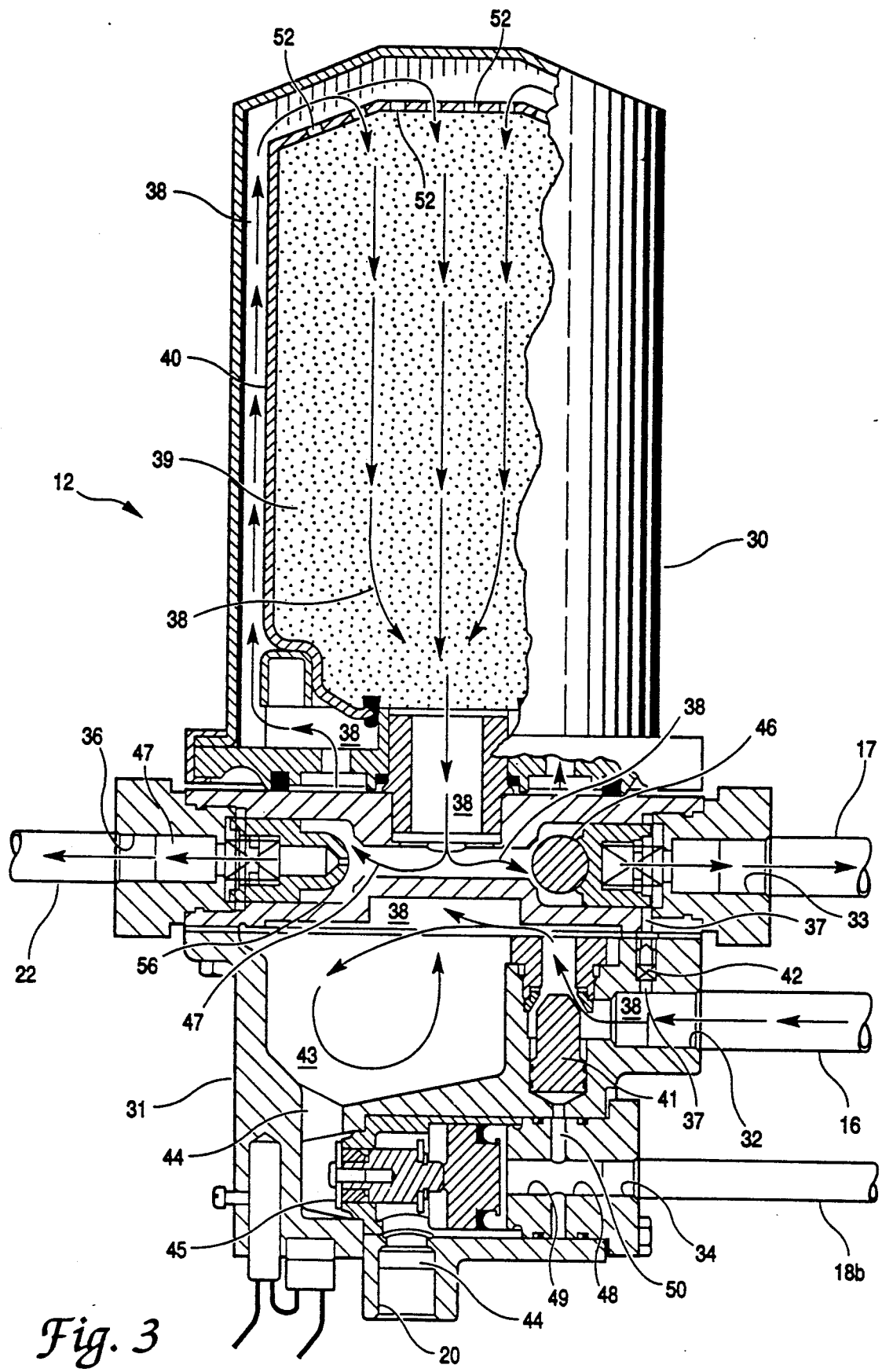
FIG. 3 is a partial sectioned front elevational view of an air dryer according to the preferred embodiment of the present invention during its loading cycle.
Figure 4:
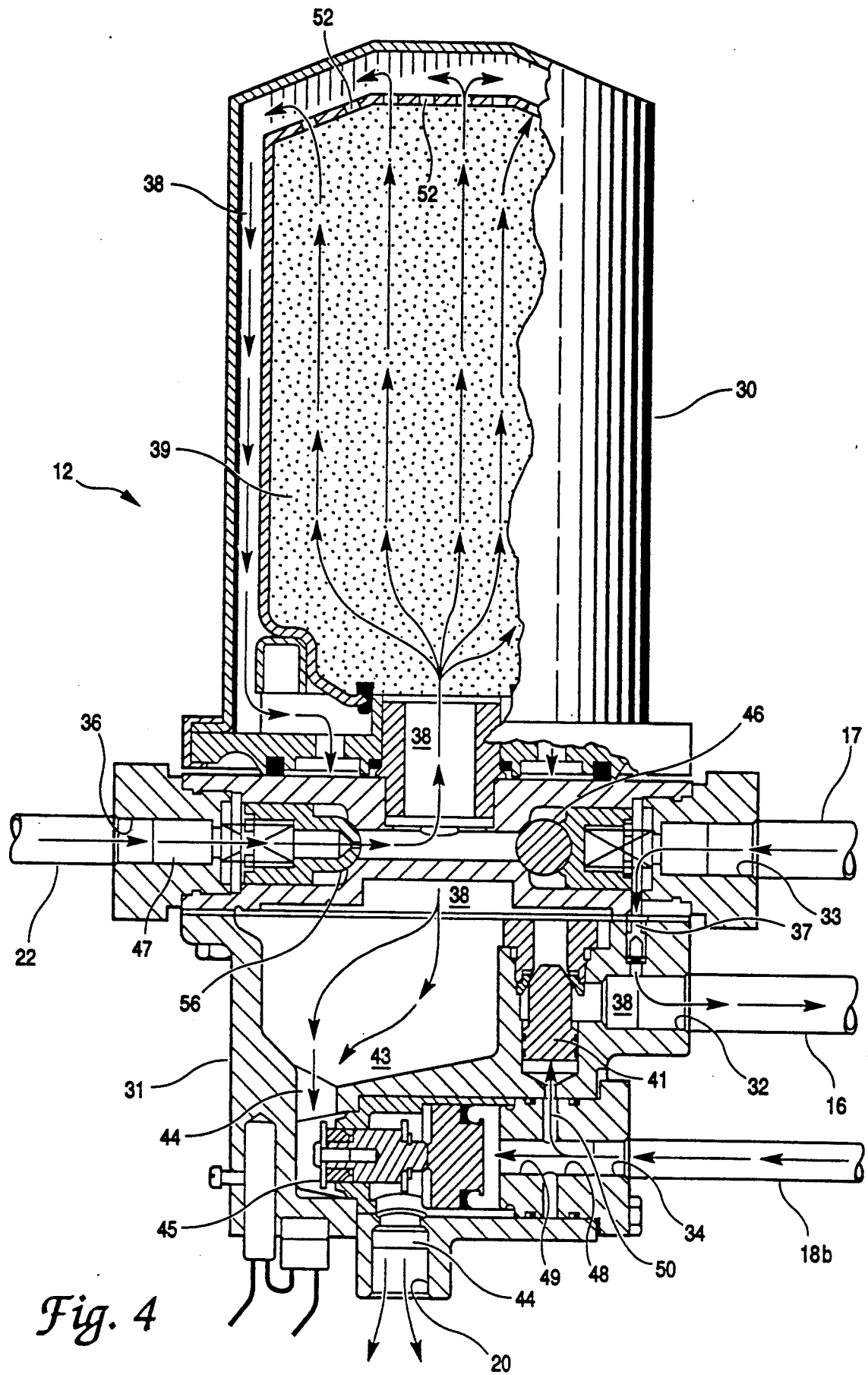
FIG. 4 is a partial front elevational view of the air dryer shown in FIG. 3 during its unloading cycle.

Referring now to FIGS. 3 and 4, the internal structure of air dryer 12 is illustrated in order to better explain its internal valving and passageway structure. FIG. 3 shows air dryer 12 during the loading cycle while FIG. 4 shows air dryer 12 during the unloading cycle. As previously discussed with respect, to FIGS. 1 and 2, air dryer 12 includes a first storage port 33 which connects to the storage tank via pipe 17, a compressor port 32 which connects to the compressor via pipe 16, a control inlet 34, which connects to the air governor via pipe 18b, and a purge tank port 36 which connects to the purge volume via pipe 22. Of course it being understood that the auxiliary purge tank 14 and port 36 shown in FIGS. 1 and 2 could be eliminated by incorporating a purge cavity into the air dryer 12 rather than by providing an auxiliary purge tank as shown in FIGS. 1 and 2.

Air dryer 12 includes an upper spin-on canister portion 30, which contains the moisture-removing means for the air dryer, and a lower housing portion 31. Canister portion 30 is preferably threadedly engaged to lower portion 31 so that it can be readily replaced by simply unscrewing canister portion 30 from the lower portion 31 and replacing it with a new canister portion having fresh desiccant material therein. Air dryer 12 includes a primary passageway 38 between compressor port 32 and storage port 33, and a secondary passageway 37 between port 32 and port 33. A small check valve 42 is disposed within secondary passageway 37 and keeps the passageway closed during the loading cycle as shown in FIG. 3. A moisture-removing means, such as a desiccant material 39, is disposed within primary passageway 38 between compressor port 32 and storage port 33. In this case, the desiccant material is disposed within an inner container 40 which is surrounded by the outer wall of canister portion 30 such that a flow path is created as shown in FIG. 3. An isolation valve 41 is disposed within primary passageway 38 between compressor port 32 and desiccant material 39. Valve 41 is maintained open during the loading cycle but is pneumatically closed by the air governor during the unloading cycle such that primary passageway 38 maintained closed during the unloading cycle.

A sump 43 is disposed within primary passageway 38 between isolation valve 41 and the moisture-removing means or desiccant 39. Sump 43 is connected via branch passageway 44 to purge outlet 20 at the base of air dryer 12. A second pneumatically activated valve 45 is disposed within branch passageway 44 and normally maintains conduit 44 closed during the loading cycle as shown in FIG. 3 but opens conduit 44 during the unloading cycle as shown in FIG. 4. A check valve 46 is disposed within primary passageway 38 between the desiccant material 39 and the storage port 33 to the storage tank. During the loading cycle, the pressure of the air exiting desiccant material via primary passageway 38 opens the check valve 46 as shown to allow dry pressurized air to flow through storage port 33 and into pipe 17 to the storage tank. At the same time, a portion of the dry pressurized air flows via another branch passageway 47 into pipe 22 via purge tank port 36 to the purge tank. A bleed/check valve 56 is disposed within branch passageway 47 between the desiccant material 39 and purge tank port 36. Valve 56 acts as a check valve during the loading cycle as shown in FIG. 3 but as a bleed valve during the unloading cycle to permit air from the purge tank to bleed into the dryer to regenerate desiccant material 39 as shown in FIG. 4

During the loading cycle, compressed air flows into compressor port 32 from pipe 16 and enters 38 primary passageway 38 adjacent isolation valve 41. The compressed air passes through valve 41 and then passes through sump 43 on its way up into canister 30 as shown in FIG. 3. The compressed air then travels between inner container 40 and outer canister 30 until it reaches holes 52 made in the top of inner container 40 to allow the compressed air to enter inner container 40 and pass through desiccant material 39 to remove any moisture from the compressed air. The dried compressed air then continues through the middle of air dryer 12 through continuing through primary passageway 38 where it branches in one direction to flow through check valve 46 and through storage port 33 toward the storage tank, and simultaneously through valve 56 and branch passageway 47, out of port 36 and into pipe 22 to purge tank 14.

The loading cycle shown in FIGS. 1 and 3 will continue until the air governor senses that the storage tank is full and has achieved a predetermined pressure. At this point, the air governor will allow pressurized air from the storage tank to flow into pipe 18 and on into pipe 18b to activate the purge valve 45 and isolation valve 41 simultaneously. In other words, valve 41 is pneumatically activated when pressurized air flows into inlet 34 and into conduit 48 through conduit 50 to the bottom of valve 41 pushing it upward into its seat to close primary passageway 38 as shown in FIG. 4. At the same time, pressurized air from the air governor branches off from conduit 48 into conduit 49 to activate a piston which pushes valve 45 to an open position to open branch passageway 44 to purge outlet 20. Also at the same time, check valve 46 closed due to the lack of pressurized air, and thus compressor port 32 and storage port 33 are isolated from the remainder of the air dryer but are connected to one another via secondary passageway 37. In the unloading cycle as shown in FIG. 4, small amounts of dry compressed air are allowed to flow directly from pipe 17 into secondary passageway 37 past check valve 42 and then on into pipe 16 in order to maintain pipe 16 in a pressurized state. Because of the relatively small volume of pipe 16, only small amounts of dry compressed air need pass through check valve 42 in order to maintain pressure in pipe 16.

When the system is switched into its unloading cycle as shown in FIG. 4, the dry compressed air contained in the purge tank is allowed to re-enter the air dryer via port 36, into branch passageway 47 through the bleed hole in valve 56, into primary passageway 38 and then immediately up into desiccant material 39 at the base of cannister portion 30. The dry air from the purge tank then flows up through the desiccant material 39 in order to regenerate the same through holes 52 in the top of inner container 40 and then down along the outside of inner container 40 in a flow path direction directly opposite to that of the loading cycle. The air then flows out of canister 30 into lower portion 31, into sump 43 where the moisture is collected and purged from the air dryer through branch passageway 44 past valve 45 and out of purge outlet system will continue in its unloading cycle until the pressure within the storage container drops below a predetermined pressure, at which point governor 15 will switch the system back to its loading cycle by venting the pressurized air in pipe 18 to the atmosphere. The loss of pressurized air in pipe 18b will in turn cause isolation valve 41 to return to its normally open position and purge valve 45 to return to its normally closed position, at which point the system will continue in a new loading cycle until the storage tank is filled again.

While the isolation valve 41 and purge valve 45 are shown as being pneumatically activated, they could equally well be electrically activated without departing from the intended scope of the present invention. Likewise, the moisture-removing means could be any type well known in the art as opposed to a desiccant moisture-removing means as described previously.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gas dryer for use in cooperative arrangement with a gas compressor system having a gas compressor, a gas governor and a gas reservoir, the gas dryer comprising:

a housing having a first port, a second port and an outlet, said housing also having a primary passageway from said first port to said second port and a secondary passageway from said first port to said second port;

means, within said primary passageway, for removing moisture from a gas passing through said primary passageway;

a first valve in said primary passageway between said second port and said means for removing moisture, said first valve being normally open but closing in response to a first signal from said gas governor;

a second valve in said secondary passageway, said second valve allowing gas to flow in only one direction from said first port to said second port;

a branch passageway from said primary passageway to said outlet, said branch passageway opening into said primary passageway between said first valve and said means for removing moisture; and a third valve in said branch passageway, said third valve being normally closed but opening in response to a second signal from said gas governor.

2. The gas dryer of claim 1 further comprising a fourth valve in said primary passageway between said means for removing moisture and said first port, said fourth valve allowing gas to flow in one direction form said means for removing moisture to said first port.

3. The gas dryer of claim 2 wherein the gas compressor system includes a purge tank and the gas dryer further comprises a third port to the purge tank; and said housing further includes a second branch passageway from said primary passageway to said third port, said second branch passageway opening into said primary passageway between said means for removing moisture and said first port.

4. The gas dryer of claim 1 wherein said housing further includes an inlet form the gas governor, a first conduit form said inlet to said first valve and a second conduit from said inlet to said third valve;

said first valve and said third valve being pneumatically responsive to a pressure signal from the gas governor via said first conduit and said second conduit, respectively.

5. A gas dryer for use in cooperative arrangement with a gas compressor system having a loading cycle and an unloading cycle, the gas dryer comprising:

a housing having a first port, a second port and an outlet, said housing also having a primary passageway form said first port to said second port and a secondary passageway form said first port to said second port;

means, within said primary passageway, for removing moisture from a gas passing through said primary passageway;

a first valve in said primary passageway between said second port and said means for removing moisture;

means for actuating said first valve to open during the loading cycle and close during the unloading cycle;

a second valve in said secondary passageway;

means for actuating said second valve to close during the loading cycle and open during the unloading cycle;

a branch passageway from said primary passageway to said outlet, said branch passageway opening into said primary passageway between said first valve and said means for removing moisture;

a third valve in said branch passageway; and means for actuating said third valve to close during the loading cycle and open during the unloading cycle.

6. The gas dryer of claim 5 wherein said housing further includes an inlet, a first conduit from said inlet to said means for actuating said first valve and a second conduit from said inlet to said means for actuating said third valve;
said means for actuating said first valve to close includes pressurizing the gas in said first conduit above a first predetermined pressure;
said means for actuating said third valve to open includes pressurizing the gas in said second conduit above said predetermined pressure.

7. The gas dryer of claim 6 wherein said second valve is a check valve that permits gas flow in only one direction form said first port to said second port.

8. The gas dryer of claim 7 further comprising a fourth valve in said primary passageway between said means for removing moisture and said first port; and
means for actuating said fourth valve to open during the loading cycle and close during the unloading cycle.

9. The gas dryer of claim 8 wherein said fourth valve is a check valve that permits gas flow in only one direction form said primary passageway to said first port.

10. A gas compressor system having a loading cycle and an unloading cycle comprising:
a gas compressor having a compressor inlet and a compressor outlet;
a gas storage tank having a storage inlet and a storage outlet; and
a gas dryer comprising:
a housing having a first port, a second port and an outlet, said housing also having a primary passageway from said first port to said second port and a secondary passageway for said first port to said second port;
means, within said primary passageway, for removing moisture form a gas passing through said primary passageway;
a first valve in said primary passageway between said second port and said means for removing moisture;
means for actuating said first valve to open during said loading cycle and close during said unloading cycle;
a second valve in said secondary passageway;
means for actuating said second valve to close during said loading cycle and open during said unloading cycle;
a branch passageway from said primary passageway to said outlet, said branch passageway opening into said primary passageway between said first valve and said means for removing moisture;
a third valve in said branch passageway;
means for actuating said third valve to close during said loading cycle and open during said unloading cycle; and
the system further comprises a purge tank in communication with said primary passageway between said means for removing moisture and said first port;
a first pipe connecting said compressor outlet to said second port of said gas dryer;
a second pipe connecting said first port of said gas dryer to said storage inlet;
means for blocking gas flow through said second pipe when the system is in said unloading cycle; and
control means for switching the system from said loading cycle to said unloading cycle when the gas pressure in said storage tank exceeds a first predetermined pressure, and for switching the system from said unloading cycle to said loading cycle when the gas pressure in said storage tank drops below a second predetermined pressure.

11. The gas compressor system of claim 10 wherein said means for blocking gas flow through said second pipe is a check valve in said primary passageway between said means for removing moisture and said first port of said gas dryer, said check valve permitting gas flow in only one direction form said primary passageway to said first port.

12. The gas compressor system of claim 11 wherein said second valve is a check valve that permits gas flow in only one direction from said first port to said second port.

* * * * *

UNITED STATES PATENT AND TRADEMARK OFFICE
CERTIFICATE OF CORRECTION

PATENT NO. : 5,252,034

DATED : October 12, 1993

INVENTOR(S) : Roger L. Sweet

It is certified that error appears in the above-identified patent and that said Letters Patent is hereby corrected as shown below:

```
In column 6, line 26, please change "form" to --from--.
In column 6, line 37, please change "form" to --from--.
In column 6, line 38, please change "form" to --from--.
In column 6, line 49, please change "form" to --from--.
In column 6, line 50, please change "form" to --from--.
In column 7, line 26, please change "form" to --from--.
In column 7, line 40, please change "form" to --from--.
```

Signed and Sealed this

Twelfth Day of April, 1994

Attest:

BRUCE LEHMAN

*Attesting Officer*     *Commissioner of Patents and Trademarks*